United States Patent
Ishida et al.

(10) Patent No.: US 12,392,539 B2
(45) Date of Patent: Aug. 19, 2025

(54) PARTICLES OBJECT FREEZING DEVICE

(71) Applicant: MAYEKAWA MFG. CO., LTD., Tokyo (JP)

(72) Inventors: Hiroshi Ishida, Tokyo (JP); Takaaki Ito, Tokyo (JP); Akira Iwashita, Tokyo (JP); Pancer Branko, Szentendre (HU)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 18/259,492

(22) PCT Filed: Jun. 3, 2022

(86) PCT No.: PCT/JP2022/022649
§ 371 (c)(1),
(2) Date: Jun. 27, 2023

(87) PCT Pub. No.: WO2023/233659
PCT Pub. Date: Dec. 7, 2023

(65) Prior Publication Data
US 2024/0377120 A1   Nov. 14, 2024

(51) Int. Cl.
*F25D 13/06*   (2006.01)

(52) U.S. Cl.
CPC .................................. *F25D 13/067* (2013.01)

(58) Field of Classification Search
CPC ......... F25D 13/067; F25D 3/11; A23B 7/055; A23B 7/0408; A23L 3/375; A23L 3/361; F26B 17/04; F26B 3/08; B01J 8/36
See application file for complete search history.

(56) References Cited

U.S. PATENT DOCUMENTS

| | | |
|---|---|---|
| 3,807,186 A | 4/1974 | Hardy |
| 3,864,931 A | 2/1975 | Guttinger |
| 4,881,379 A | 11/1989 | Sakai |

(Continued)

FOREIGN PATENT DOCUMENTS

| | | |
|---|---|---|
| EP | 3216352 A1 | 9/2017 |
| WO | 9307429 A1 | 4/1993 |

(Continued)

OTHER PUBLICATIONS

Office Action issued in Japanese Application No. 2023-539254 mailed Aug. 13, 2024. English translation provided.

(Continued)

*Primary Examiner* — Frantz F Jules
*Assistant Examiner* — Martha Tadesse
(74) *Attorney, Agent, or Firm* — ROSSI, KIMMS & McDOWELL LLP

(57) ABSTRACT

A particles object freezing device includes an air-permeable belt configured to support conveyance of a particles object, and an injection plate which includes a plurality of injection holes configured to inject a cooling gas for fluidizing the particles object toward the belt from below. The injection plate includes a first injection part and a second injection part which are disposed along a width direction of the belt, and are different in opening ratio. A first boundary between the first injection part and the second injection part is along a traveling direction of the belt.

12 Claims, 11 Drawing Sheets

(56) References Cited

U.S. PATENT DOCUMENTS

| | | | |
|---|---|---|---|
| 5,357,688 A * | 10/1994 | Christensen | B01J 8/36 |
| | | | 34/360 |
| 5,408,921 A | 4/1995 | Persson et al. | |
| 5,467,612 A | 11/1995 | Venetucci | |
| 5,832,734 A * | 11/1998 | Rothstein | A23B 2/425 |
| | | | 62/380 |
| 5,913,590 A | 6/1999 | Backus | |
| 7,823,409 B2 | 11/2010 | Colding-Kristensen et al. | |
| 9,833,014 B2 | 12/2017 | Chang et al. | |
| 2014/0069124 A1 * | 3/2014 | Chang | F26B 17/04 |
| | | | 62/340 |
| 2024/0377120 A1 | 11/2024 | Ishida et al. | |

FOREIGN PATENT DOCUMENTS

| | | | | |
|---|---|---|---|---|
| WO | WO-2005073649 A1 * | 8/2005 | | A23B 4/062 |
| WO | 2006126870 A1 | 11/2006 | | |
| WO | 2012001798 A1 | 1/2012 | | |

OTHER PUBLICATIONS

Office Action issued in U.S. Appl. No. 18/259,530 mailed Feb. 18, 2025.

Office Action issued in Canadian Appln. No. 3,204,759 mailed Dec. 2, 2024.

Office Action issued in Japanese Patent Application No. 2023-539259 mailed Aug. 20, 2024. English translation provided.

International Search Report issued in Intl. Appln. No. PCT/JP2022/022649 mailed Jan. 2, 2023.

Written Opinion issued in Intl. Appln. No. PCT/JP2022/022649 mailed Jan. 2, 2023.

International Search Report issued in Intl. Appln. No. PCT/JP2022/022658 mailed Jan. 2, 2023.

Written Opinion issued in Intl. Appln. No. PCT/JP2022/022658 mailed Jan. 2, 2023.

Copending U.S. Appl. No. 18/259,530, filed Jun. 27, 2023 (not included because the cited application is not yet available to the public and the Examiner has ready access to the cited application).

* cited by examiner

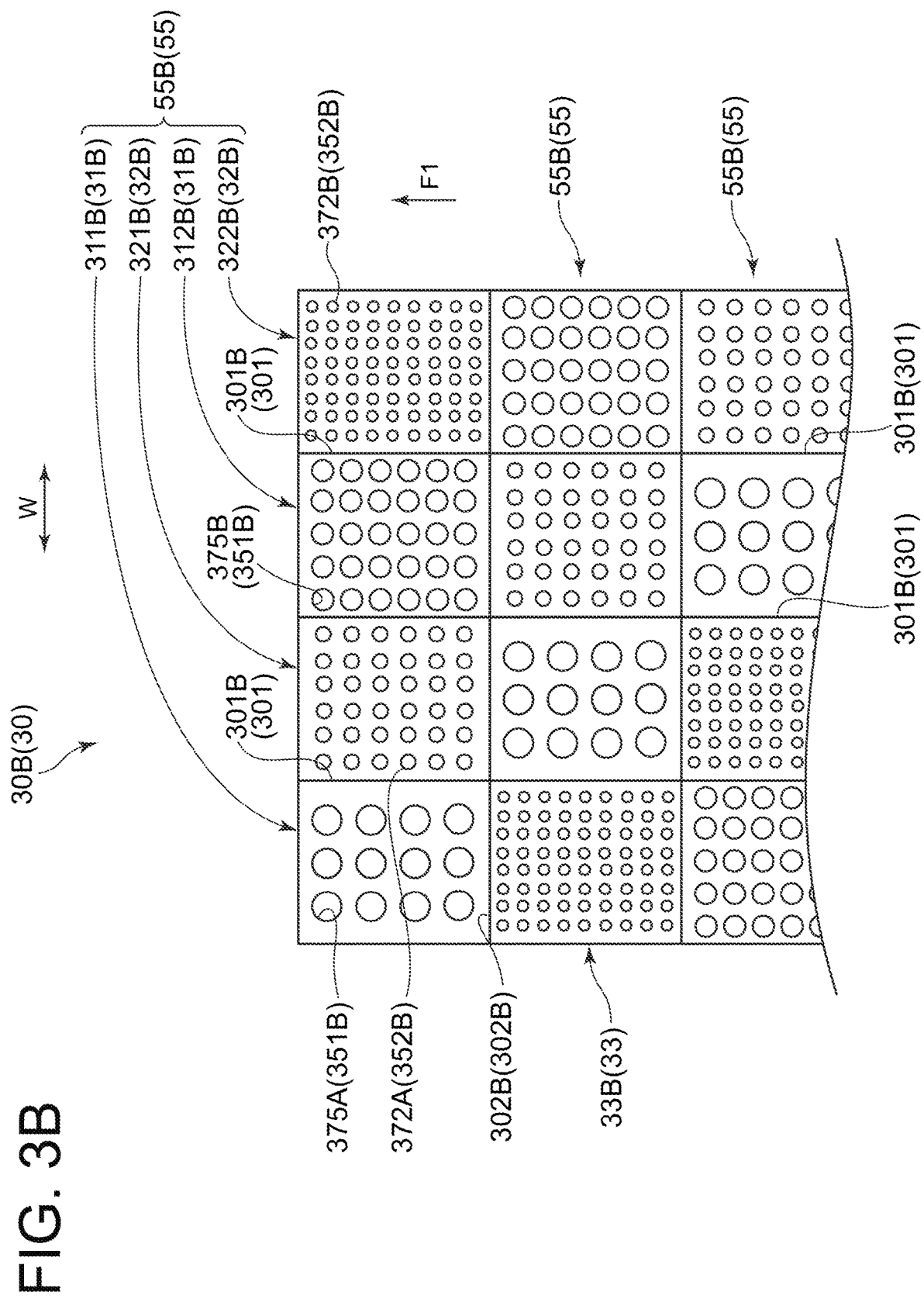

PARTICLES OBJECT FREEZING DEVICE

TECHNICAL FIELD

The present disclosure relates to a particles object freezing device.

BACKGROUND ART

A particles object freezing device for freezing a particles object has conventionally been known. For example, a particulate material freezing apparatus disclosed by Patent Document 1 includes a plurality of porous plates disposed at intervals under a conveyor belt for conveying particulate materials. Fluidization of the particulate material passing immediately above the plates is suppressed, and fluidization of the particulate material passing immediately above a gap between any two plates is promoted.

Citation List

Patent Literature

PTL 1: Patent Document 1: U.S. Pat. No. 9,833,014B

SUMMARY

Technical Problem

In order to promote freezing of particles objects, a porous plate preferably includes a plurality of regions with different opening ratios. This is because a flow of a cooling gas toward a conveyor belt from below varies, promoting active movement of the particles objects. However, if the above-described plurality of regions are arranged only in a conveying direction, active movement of the particles objects having different rates of freezing may become dominant above a conveyor belt. Consequently, appearance quality of the frozen particles objects may be deteriorated.

An object of the present disclosure is to provide a particles object freezing device improved in appearance quality of the frozen particles objects.

Solution to Problem

A particles object freezing device according to at least one embodiment of the present disclosure includes an air-permeable belt configured to support conveyance of a particles object, and an injection plate which includes a plurality of injection holes configured to inject a cooling gas for fluidizing the particles object toward the belt from below. The injection plate includes a first injection part and a second injection part which are disposed along a width direction of the belt, and are different in opening ratio. A first boundary between the first injection part and the second injection part is along a traveling direction of the belt.

Advantageous Effects of Invention

According to the present disclosure, it is possible to provide a particles object freezing device improved in appearance quality of a frozen particles object.

BRIEF DESCRIPTION OF DRAWINGS

FIG. 3B is a conceptual explanatory view of another injection plate according to an embodiment of the present disclosure.

DETAILED DESCRIPTION

Figure 1:
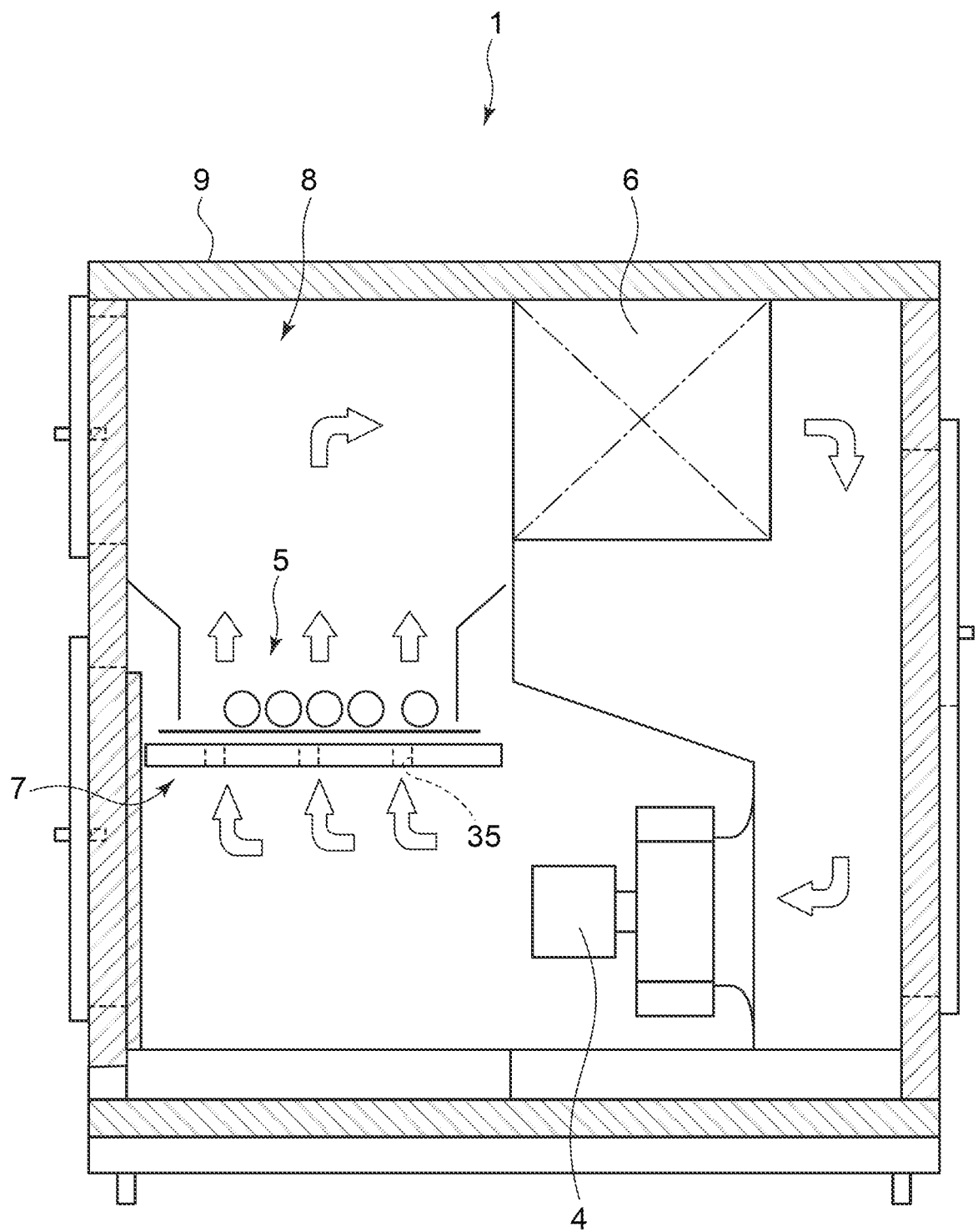
FIG. 1 is a conceptual cross-sectional view of a freezing device according to an embodiment of the present disclosure.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including" or "having" one constitutional element is not an exclusive expression that excludes the presence of other constitutional elements.

The same configurations are indicated by the same reference characters and may not be described again in detail.

1. OVERVIEW OF PARTICLES OBJECT FREEZING DEVICE 1

Figure 2:
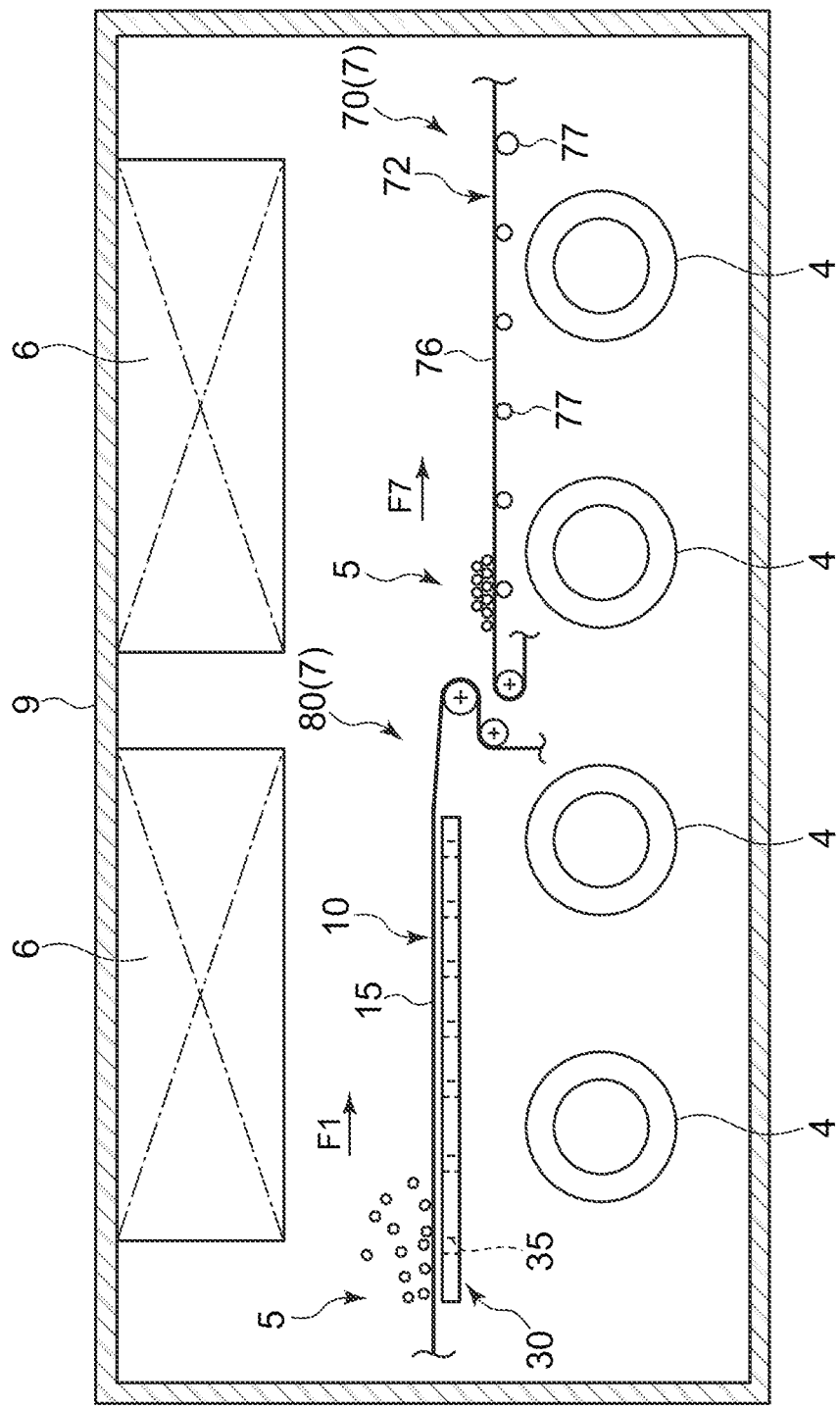
FIG. 2 is another conceptual cross-sectional view of the freezing device according to an embodiment of the present disclosure.

The overview of a particles object freezing device 1 (hereinafter, will also be referred to as the "freezing device 1") according to an embodiment of the present disclosure will be exemplified with reference to FIG. 1, 2. FIGS. 1 and 2 are each a conceptual cross-sectional view of the freezing device 1 according to an embodiment of the present disclosure.

The freezing device 1 is configured to freeze an edible particles object 5. The edible particles object 5 (hereinafter, will also be referred to as the "particles object 5") is, for example, a particles fruit, a diced or sliced fruit. The particles fruit includes a raspberry, a blueberry, a strawberry, a grape, a cherry, or the like. As another example, the particles object 5 may be a grain, a bean, a whole vegetable, a sliced or diced vegetable, pasta, rice, or diced meat, etc. Hereinafter, an example will be described in which the particles object 5 is the particles fruit.

In the freezing device 1 of the present embodiment, as a method for individually freezing the particles objects 5, IQF (Individual Quick Freeze) is adopted as an example.

As exemplified in FIG. 1, the freezing device 1 according to an embodiment of the present disclosure includes a case 9 mainly formed by an insulation material. The case 9 internally forms a circulation passage 8 for a cooling gas such as air. The circulation passage 8 is provided with a blower 4 for sending the cooling gas, a conveying device 7 for conveying the particles objects 5, and a cooler 6 for cooling the cooling gas, in order from upstream. If the blower 4, which may include a variable-speed fan or the like as an example, is driven, the cooling gas blows against the particles objects 5, which are conveyed by the conveying device 7, from below to cool the particles objects 5. The cooling gas which is increased in temperature by cooling the particles objects 5 is cooled by the cooler 6 and returns to the blower 4. The cooler 6 is a heat exchanger configured to evaporate a refrigerant circulating in another place by heat exchange with the cooling gas. The cooling gas is cooled by the evaporation of the refrigerant.

In another embodiment, a configuration may be adopted where the cooling gas is sequentially supplied in the case 9 instead of circulating the cooling gas in the case 9. In this case, the freezing device 1 may not include the cooler 6, and the case 9 may be connected to, via a pipe, a tank storing the cooling gas whose boiling point is less than 0° C. in a liquefied state, for example. The cooling gas in this case is, for example, nitrogen gas.

As exemplified in FIG. 2, the above-described conveying device 7 includes a conveying unit 80 for supportingly conveying the particles objects 5 which are relatively in an early period of being loaded into the case 9, and a downstream conveying unit 70 for supportingly conveying the particles objects 5 received from the conveying unit 80 further downstream. The particles objects 5 are each frozen in a surface portion thereof while fluidization and conveyance by the conveying unit 80, and are each frozen in an interior portion thereof while being supportingly conveyed by the downstream conveying unit 70.

In the present embodiment, a conveying direction (arrow F1) of the particles objects 5 by the conveying unit 80 and a conveying direction (arrow F7) of the particles objects 5 by the downstream conveying unit 70 are the same direction parallel to the horizontal direction. Further, in the present embodiment, the plurality of coolers 6 and the plurality of blowers 4 are disposed along the conveying direction by the conveying unit 80.

The more specific overview of the conveying unit 80 will be exemplified. The conveying unit 80 includes a belt 10 stretched over a plurality of sprockets, a driving part (not shown) for driving the belt 10, and an injection plate 30. The belt 10 configured to support conveyance of the particles objects 5 has air permeability. The air permeability of the belt 10 is implemented by providing a plurality of vents 49 (for example, see FIG. 5A) for the belt 10.

The driving part of the present embodiment is a motor, and may be disposed outside or inside the case 9. In the embodiment where the driving part is disposed outside the case 9, it is configured such that the belt 10 passes through a first belt passing hole (not shown) disposed in the case 9. In this case, a conveying portion 15, which is an upper end portion of the belt 10 extending horizontally, receives the particles objects 5 on the outer side of the case 9 and conveys the received particles objects 5 into the case 9. In another embodiment where the driving part is disposed inside the case 9, the conveying portion 15 receives the particles objects 5 loaded into the case 9 and conveys the received particles objects 5 downstream. In the present embodiment, a traveling direction of the conveying portion 15 coincides with the conveying direction (arrow F1) of the particles objects 5 by the conveying unit 80 described above.

The injection plate 30 is located below the conveying portion 15. The injection plate 30 includes a plurality of injection holes 35 configured to inject the cooling gas sent from the blower 4 toward the conveying portion 15. The cooling gas injected by the injection holes 35 passes through the air-permeable belt 10 and blows against the particles objects 5, thereby fluidizing the particles objects 5.

The fluidizing particles objects 5 are conveyed in a dispersed state, making it possible to suppress that the plurality of particles objects 5 are frozen in a state where wet surfaces of the particles objects 5 are in contact with each other. Thus, it is possible to suppress coagulation freezing where the plurality of particles objects 5 are frozen in clumps. The configuration of the injection plate 30 will be described in detail later.

Fluidization of the particles objects 5 is a concept that includes movement in the conveying portion 15, movement on top of the different one or plurality of particles objects 5 placed on the conveying portion 15, floating with different intensity from the conveying portion 15, a combination thereof, or the like.

The more specific overview of the downstream conveying unit 70 will be exemplified. The downstream conveying unit 70 includes a downstream belt 72 stretched over a plurality of sprockets, a downstream driving part (not shown) for driving the downstream belt 72, and a plurality of rails 77 disposed in the conveying direction of the particles objects 5.

The downstream belt 72 is disposed lower than the conveying portion 15 of the belt 10. As with the belt 10, the downstream belt 72 has air permeability. The cooling gas sent from the blowers 4 passes through the downstream belt 72 from bottom to top and blows against the particles objects 5. In the present embodiment, the injection plate 30 is not provided below a downstream conveying portion 76 which is an upper end portion of the downstream belt 72 extending horizontally. Therefore, the particles objects 5 conveyed by the downstream conveying portion 76 do not float relative to when the particles objects 5 pass above the injection plate 30. However, freezing in the surface of each particles object 5 is finished at least to some extent at the end of conveyance by the conveying portion 15. Accordingly, the particles objects 5 conveyed by the downstream conveying portion 76 hardly cause coagulation freezing described above.

The downstream driving part of the present embodiment is a motor disposed outside or inside the case 9. In the embodiment where the downstream driving part is disposed outside the case 9, it is configured such that the downstream belt 72 passes through a second belt passing hole (not shown) disposed in the case 9. In this case, the particles objects 5 whose freezing is completed are discharged outside the case 9 by the downstream belt 72.

The plurality of rails 77 extend in a width direction of the downstream belt 72 and support the downstream conveying portion 76. Each rail 77 of the present example does not rotate about the axis. Each rail 77 of another example may be rotatable about the axis.

2. DETAILED CONFIGURATION OF THE INJECTION PLATE 30

Figure 3A:
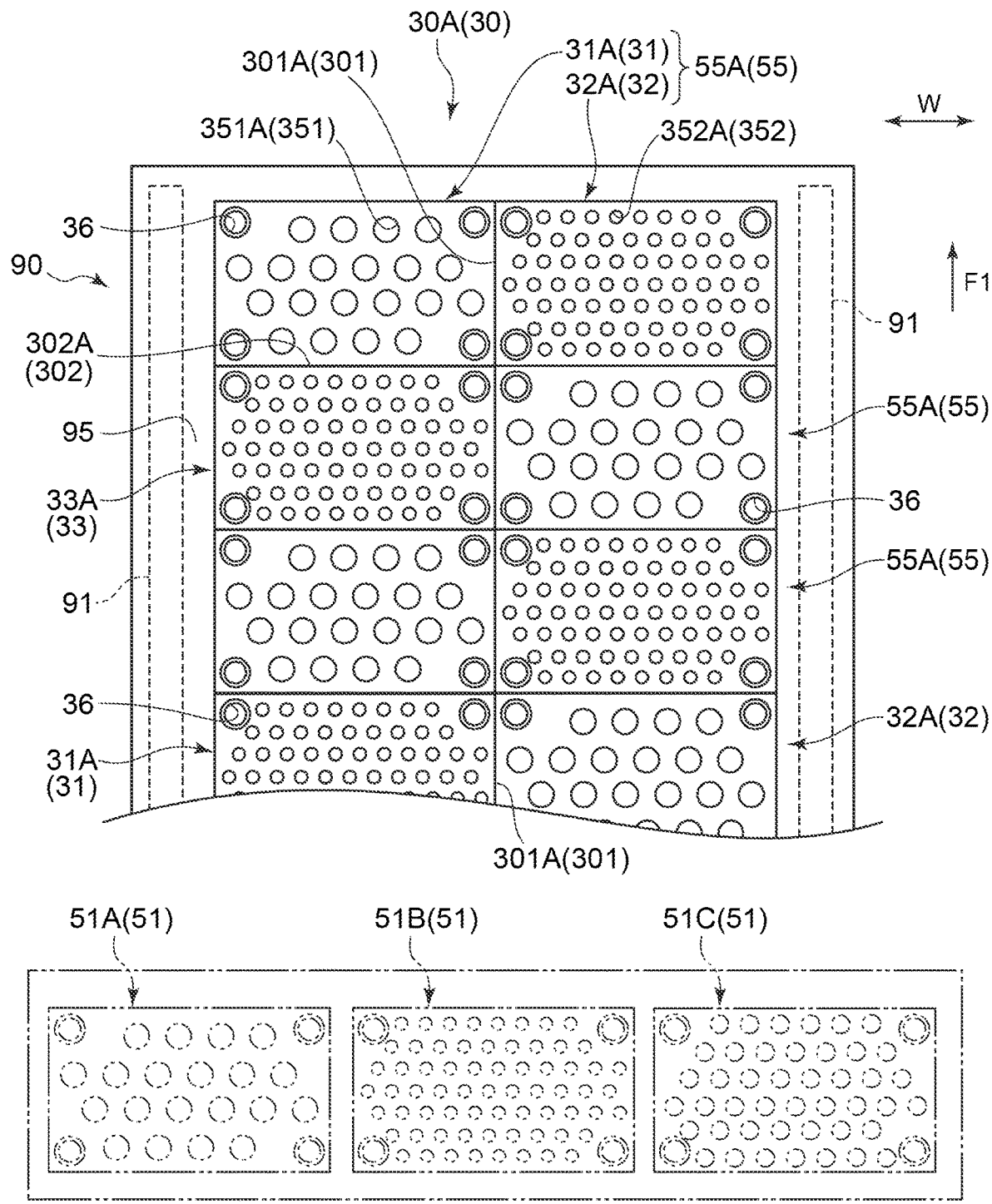
FIG. 3A is a conceptual explanatory view of an injection plate according to an embodiment of the present disclosure.
Figure 3C:
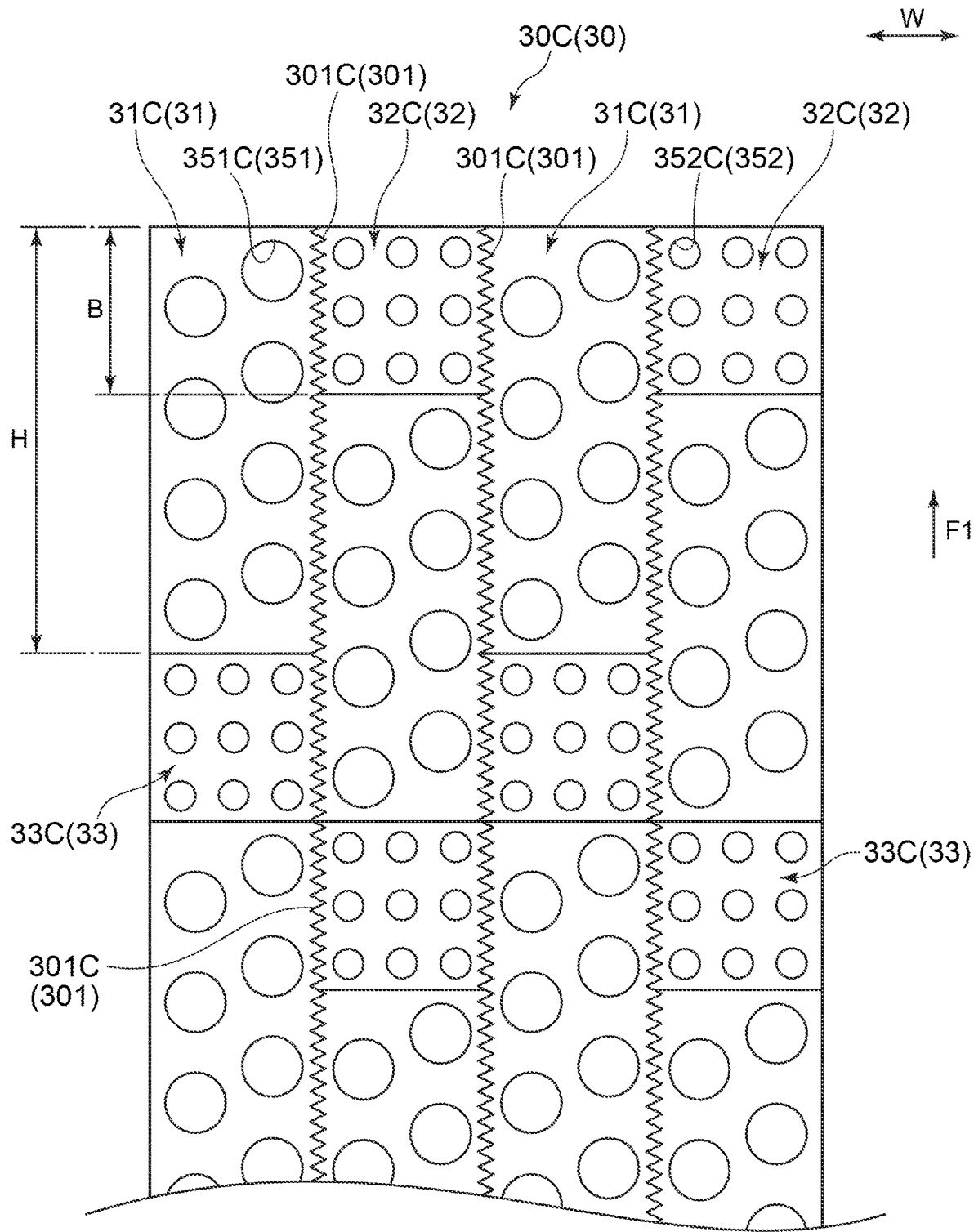
FIG. 3C is a conceptual explanatory view of still another injection plate according to an embodiment of the present disclosure.
Figure 4:
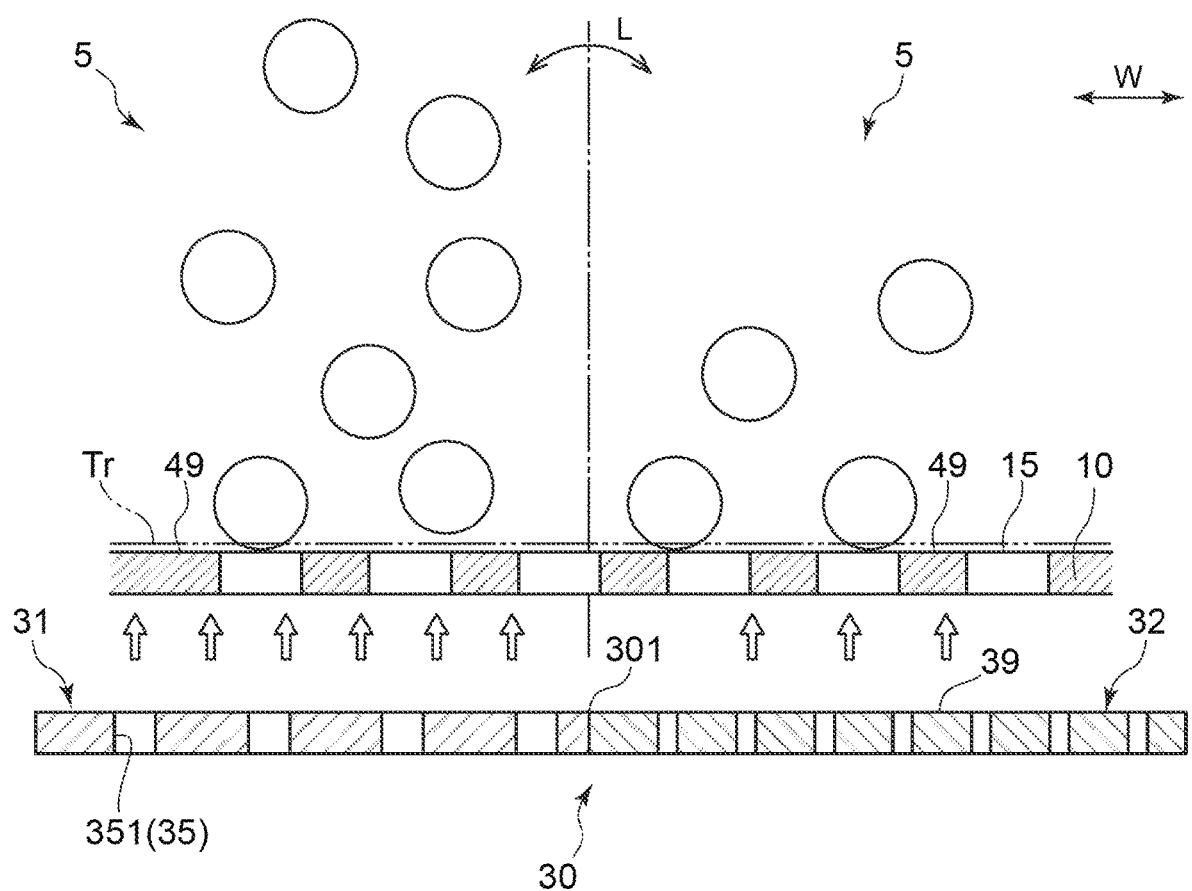
FIG. 4 is a conceptual explanatory view of the injection plate and a belt as viewed from a conveying direction according to an embodiment of the present disclosure.

The detailed configuration of the injection plate 30 will be exemplified with reference to FIGS. 3A to 4. FIGS. 3A to 3C are, respectively, conceptual explanatory views of injection plates 30A to 30C according to some embodiments. FIG. 4 is a conceptual explanatory view of the injection plate 30 and the belt 10 as viewed from the conveying direction according to an embodiment of the present disclosure.

An arrow W illustrated in each view indicates a width direction of the belt 10 (hereinafter, may simply be referred to as the "width direction"), and the arrow F1 indicates the traveling direction of the conveying portion 15 of the belt 10 (the conveying direction of the particles objects 5) as has already been described. Further, FIG. 4 omits illustration of a sliding portion 20 (for example, see FIG. 5A) to be described later which is a constituent element of the belt 10.

As shown in FIGS. 3A to 3C, the injection plates 30A to 30C, respectively, include first injection parts 31A to 31C (31) and second injection parts 32A to 32C (32). As shown in FIGS. 3A to 3C, the first injection part 31 and the second injection part 32 are independent of each other as an example. In this case, the first injection part 31 and the second injection part 32 may be in contact with each other, or may be disposed at an interval in the width direction. In another embodiment, the first injection part 31 and the second injection part 32 may be formed integrally with each other (not shown).

The first injection part 31 and the second injection part 32 are disposed along the width direction of the belt 10, and have different opening ratios. In the present example, the opening ratio of the first injection part 31 is higher than the opening ratio of the second injection part 32. Further, the inner diameter of an injection hole 351 (35) of the first injection part 31 is larger than the inner diameter of an injection hole 352 (35) of the second injection part 32.

In the embodiment exemplified in FIG. 3A. 3C, the first injection part 31A, 31C and the second injection part 32A 32C are prepared by one type of each. An injection hole 351A, 351C (351) of the first injection part 31A, 31C has a larger inner diameter than an injection hole 352A, 352C (352) of the second injection part 32A. 32C.

In the embodiment exemplified in FIG. 3B, at least one of the first injection part 31B or the second injection part 32B is prepared by not less than two types. More specifically, the first injection part 31B (31) includes the two types of first injection parts 311B. 312B each having the opening ratio of not less than a prescribed value, and the second injection part 32B (32) includes the two types of second injection parts 321B, 322B each having the opening ratio of less than the prescribed value. In FIG. 3B, an injection hole 351B (351) of the first injection part 31B is indicated by reference character 375A, 375B, and an injection hole 352B (352) of the second injection part 32B is indicated by reference character 372A, 372B.

In another embodiment, the first injection part 31A and the second injection part 32 may each be prepared by not less than three types.

In the present embodiment, first boundaries 301A to 301C (301) which are boundaries of the first injection part 31 and the second injection part 32 are along the traveling direction of the conveying portion 15 of the belt 10 (that is, the arrow F1, may simply be referred to as the "traveling direction", hereinafter).

As a more specific example, the first boundary 301A. 301B (301) shown in FIG. 3A, 3B linearly extends in parallel to the traveling direction. Further, as shown in FIG. 3C, the first boundaries 301C along the traveling direction may have a zigzag pattern.

In the embodiment where the first injection part 31 and the second injection part 32 are integrally formed or the embodiment where the first injection part 31 and the second injection part 32 are disposed at the interval, the first boundary 301 along the traveling direction exists as long as any of a plurality of candidate virtual planes that can be a boundary between the first injection part 31 and the second injection part 32 is along the traveling direction.

Along with injection of the cooling gas by the injection plate 30 having the above-described configuration, when the particles objects 5 are conveyed, fluidized beds with different heights depending on the positions in the width direction are formed in the particles objects 5 by, for example, the following principle (see FIG. 4).

The cooling gas which is injected by the first injection part 31 having the high opening ratio is strong in momentum (higher fluidization), and the cooling gas which is injected by the second injection part 32 having the low opening ratio is weak in momentum (lower fluidization). Thus, momentum of the cooling gas passing through the conveying portion 15 of the belt 10 is uneven in the width direction, flowing the cooling gas in the width direction above the belt 10. Consequently, the particles objects 5 above the first injection part 31 and the particles objects 5 above the second injection part 32 come and go (arrow L) in the width direction, activating the particles objects 5 in movement in the width direction.

Describing another specific example of the active movement in the width direction, the particles objects 5 float high above the first injection part 31 having the strong momentum of the cooling gas, and thus stay in air for a long time. Therefore, the number of particles objects 5 placed on the conveying portion 15 is small above the first injection part 31, easily making an empty space for allowing the particles objects 5 to move on the upper surface of the conveying portion 15. By contrast, the number of particles objects 5 placed on the conveying portion 15 is large above the second injection part 32, causing the particles objects 5 to move in the above-described empty space along the width direction. Thus, the particles objects 5 are activated in movement in the width direction.

Since the particles objects 5 are activated in movement in the width direction, the particles objects 5 can fluidize at different heights in the dispersed state. The particles objects 5 can individually be exposed to the cooling gas, making it possible to maintain more active behavior even during surface freezing and thus to suppress coagulation freezing of the particles objects 5.

With the above configuration, since the first injection part 31 and the second injection part 32 having different opening ratios are disposed in the width direction of the belt 10, the conveyed particles objects 5 are activated in movement in the width direction. Further, since the first boundary 301 is along the traveling direction of the belt 10, active movement of the particles objects 5 in the width direction is further promoted with fluidization of different intensities between an area above the first injection part 31 and an area above the second injection part 32. In more detail, for example, momentum of the cooling gas passing through the conveying portion 15 is uneven greatly in the width direction, the flow of the cooling gas in the width direction becomes stronger. Thus, active movement of the particles objects 5 at different positions in the conveying direction is appropriately suppressed. That is, active movement of the particles objects 5 having the different rates of freezing is appropriately suppressed.

If the particles objects 5 having the different rates of freezing contact each other, unfrozen juice or water contained on one surface adheres to the other frozen surface. Under such fluidization, the juice or water covering the surfaces of the particles objects 5 is rapidly cooled and frozen. Consequently, appearance quality of the particles objects 5 may be deteriorated.

In this regard, with the above configuration, since active movement of the particles objects 5 having the different rates of freezing is appropriately suppressed, the freezing device I improved in appearance quality of the frozen particles objects 5 is implemented.

In the present embodiment, as exemplified in FIGS. 3A to 3C, the length of the first boundary 301 in the traveling direction is not less than one third of each of the length (maximum length) of the first injection part 31 in the traveling direction and the length (maximum length) of the second injection part 32 in the traveling direction.

For example, in the embodiment shown in FIG. 3A, 3B, the length of the first boundary 301A, 301B is equal to each of the length of the first injection part 31A, 31B in the traveling direction and the length of the second injection part 32A, 32B in the traveling direction. Further, in the embodiment shown in FIG. 3C, the length (dimension B) of the first boundary 301C is one third of the length (dimension H) of the first injection part 31, and is the same as the length of the second injection part 32. In another embodiment, the length of the first boundary 301 in the traveling direction may be not less than one-half or not less than two third of each of the length of the first injection part 31 in the traveling direction and the length of the second injection part 32 in the traveling direction.

With the above configuration, the length of the first boundary 301 in the traveling direction is ensured, allowing active movement of the particles objects 5 above the first injection part 31 and the particles objects 5 above the second injection part 32 in the width direction to be more dominant, and making it possible to further improve appearance quality of the frozen particles objects 5.

Further, in the present embodiment, as exemplified in FIG. 3A, 3B, a range where the first injection part 31A, 31B is disposed in the traveling direction, and a range where the second injection part 32A, 32B is disposed in the traveling direction coincide with each other. In other words, the arrangement is made such that both ends of the first injection part 31A, 31B in the traveling direction align with both ends of the second injection part 32A, 32B in the width direction.

With the above configuration, a destination of the particles objects 5 fluidizing across the first boundary 301A, 301B is more reliably above the first injection part 31A, 31B or above the second injection part 32A, 32B, allowing the active movement of the particles objects 5 in the width direction to be more dominant.

Further, in the present embodiment, as exemplified in FIGS. 3A to 3C, the first injection parts 31 and the second injection parts 32 are independent of each other. In the present example, the first injection part 31 and the second injection part 32 adjacent in the width direction are in contact with each other. Therefore, respective contact portions (contact end surfaces) of the first injection part 31 and the second injection part 32 form the first boundary 301. Since the first injection part 31 and the second injection part 32 are in contact with each other, passage of the cooling gas at the first boundary 301 is restricted.

With the above configuration, since the first injection part 31 and the second injection part 32 are independent of each other, each of them is replaceable, and it is possible to improve convenience of the injection plate 30. For example, if either the first injection part 31 or the second injection part 32 is broken, it is only necessary to replace the injection part that needs to be replaced, making it possible to implement high convenience of the injection plate 30.

Further, in the embodiment shown in FIG. 3A, the injection plate 30 is removably attached to a support frame 90 which is a constituent element of the freezing device 1 (see FIG. 1).

The support frame 90 of the present embodiment includes a porous support plate 95 for supporting the injection plate 30, and a pair of supports 91 for supporting the support plate 95. The support plate 95 is formed by one or a plurality of porous plate components extending in the traveling direction and the width direction, as an example. The pair of supports 91 are, respectively, located at both sides of the width direction relative to the belt 10 (see FIG. 4).

In the present example, holes 36 are disposed in each of the first injection part 31A and the second injection part 32A, and plate holes (not shown) vertically overlapping the holes 36, respectively, are also disposed in the support plate 95. A fastener member (not shown) is fastened by being inserted into the holes 36 and the plate holes, thereby removably attaching the first injection part 31A and the second injection part 32A to the support frame 90. A large hole (not shown) is formed in much of an area of the support plate 95 below the injection plate 30, and a configuration is adopted in which the flow of the cooling gas toward the injection plate 30 is not impaired.

In the embodiment shown in FIG. 3A, a plurality of injection parts 51A to 51C (51) each to be a part of the injection plate 30 are prepared in advance. The injection parts 51A to 51C (51) have the same external dimension and have different opening ratios. Then, in accordance with the type of particles object 5 to be cooled, any of the injection parts 51 are, respectively, adopted as the first injection part 31A and the second injection part 32A. That is, both of the first injection part 31A and the second injection part 32A are selectively mounted with any of the plurality of injection parts 51A to 51C (51), respectively.

In the present embodiment, any two of the three types of injection parts 51 are, respectively, adopted as the first injection part 31A and the second injection part 32A, and are attached to the support frame 90. Thus, by the replacement work of the first injection part 31A and the second injection part 32A, it is possible to change the respective opening ratios of the first injection part 31A and the second injection part 32A in accordance with the type of particles object 5. Accordingly, the injection plate 30 can properly inject the cooling gas in accordance with the particles object 5. Further, proper wind pressure control under the injection plate 30 by the speed adjustment function of the fan of the blower 4 is also added, optimizing injection of the cooling gas.

With the above configuration, since the first injection part 31A and the second injection part 32A attached to the support frame 90 are any of the plurality of injection parts 51 which are different in opening ratio, the freezing device 1 can perform proper freezing in accordance with the type of particles object 5 to be frozen.

Further, since the first injection part 31A and the second injection part 32A are removably attached to the support frame 90, even if the first injection part 31A or the second injection part 32A is newly attached to the support frame 90 along with replacement, it is possible to attach the injection part at the same attachment position as before replacement. Thus, even after replacement of at least one of the first injection part 31A or the second injection part 32A, the injection plate 30 can stably inject the cooling gas.

Further, in the present embodiment, as exemplified in FIGS. 3A to 3C, the first injection parts 31 and the second injection parts 32 have the same length in the width direction. With the above configuration, since the first injection part 31 and the second injection part 32 having the same length in the width direction are disposed in the width direction, it is possible to simplify the configuration of the injection plate 30.

In the present embodiment, as shown in FIGS. 3A to 3C, the injection plates 30A to 30C (30) further include third injection parts 33A to 33C (33) adjacent to the first injection parts 31A to 31C (31), respectively, in the traveling direction. The opening ratio of the third injection part 33 is different from the opening ratio of the first injection part 31. Further, the third injection part 33 is independent of each of the first injection part 31 and the second injection part 32, and has the same shape as the second injection part 32 as an example (the details of which are to be described later).

With the above configuration, since the opening ratio of the injection plate 30 changes not only in the width direction but also in the traveling direction, it is possible to further vary the flow of the cooling gas injected. As a more detailed example, a space where momentum of the cooling gas is strong and a space where momentum of the cooling gas is weak are disposed in the traveling direction of the conveying portion 15, the flow of the cooling gas along the traveling direction appropriately occurs above the belt 10 as well. Thus, the particles objects 5 can be exposed to the cooling gas in the more dispersed state, making it possible to suppress coagulation freezing of the particles objects 5. Accordingly, it is possible to further improve appearance quality of the frozen particles objects 5.

As shown in FIGS. 3A, 3B, the injection plates 30A and 30B (30), respectively, include a plurality of array injection parts 55A, 55B (55) which include the first injection parts 31A, 31B (31) and the second injection parts 32A, 32B (32), and are arrayed in the width direction. The number of constituent elements for the array injection parts 55 is two in FIG. 3A and four in FIG. 3B.

Further, the third injection part 33 has the same shape as any of the plurality of array injection parts 55. As a more detailed example, the third injection part 33A, 33B has the same shape as the second injection part 32A, 32B.

With the above configuration, since the third injection part 33A, 33B (33) is any of the plurality of array injection parts 55A, 55B (55) arrayed in the width direction, it is possible to simplify the configuration of the injection plate 30 while varying the flow of the cooling gas injected.

Further, in the present embodiment, a second boundary 303A, 302B (302) between the third injection part 33 and the first injection part 31 is along the width direction. In the embodiment shown in FIG. 3A, 3B, the second boundary 302A, 302B linearly extends in parallel to the width direction.

With the above configuration, it is possible to reduce a difference in fluidized status of the particles objects 5 conveyed across the second boundary 302 between the third injection part 33 and the first injection part 31. As a result, it is possible to reduce a difference in status of freezing process of the particles objects 5.

Although detailed illustration is omitted, the second boundary 302 along the width direction may have a zigzag pattern.

In the embodiment exemplified in FIG. 3A, 3B, the plurality of array injection parts 55A, 55B (55) are, respectively, a plurality of rectangular plates formed independently of each other. The plurality of rectangular plates have the same length in the traveling direction and have the same length in the width direction. The rectangular shape is a concept including a square shape.

The plurality of array injection parts 55 are arrayed in a plurality of columns along the traveling direction. In FIG. 3A, the two array injection parts 55A (that is, the first injection part 31A and the second injection part 32A) arrayed in the width direction are arrayed in not less than four columns. In FIG. 3B, the plurality of array injection parts 55B are arrayed in not less than three columns in the traveling direction. Then, in the embodiment exemplified in FIG. 3A, 3B, the opening ratio of the injection plate 30 regularly changes over an entire length of the injection plate 30A, 30B (30) in the width direction and the entire length in the traveling direction.

For example, in the injection plate 30A exemplified in FIG. 3A, the opening ratio splits into two patterns on one side and another side in the width direction, and the opening ratios of the two patterns alternately appear along the traveling direction. In the injection plate 30B exemplified in FIG. 3B, the opening ratio splits into four patterns along in the width direction, and the opening ratios of the four patterns regularly appear along the traveling direction.

With the above configuration, since the opening ratio of the injection plate 30 regularly changes over the entire length of the injection plate 30 in the width direction and the entire length of the injection plate 30 in the traveling direction, it is possible to simplify the configuration of the injection plate 30 while varying the flow of the cooling gas injected by the injection plate 30.

In the embodiment exemplified in FIG. 3A, 3B, of all the array injection parts 55 included in the injection plate 30, any two of the array injection parts 55 adjacent in the traveling direction or the width direction are in surface contact with each other. In other words, any two of the array injection parts 55 adjacent in the traveling direction are in surface contact with each other, and any two of the array injection parts 55 adjacent in the width direction are in surface contact with each other.

With the above configuration, passage of the cooling gas is restricted at respective boundaries (for example, the first boundary 301 and the second boundary 302) of the array injection parts 55. Locations through which the cooling gas passes are consolidated to the injection holes 35 of the injection plate 30, making it possible to have desired injection of the cooling gas by the injection plate 30 and to successfully freeze the particles objects 5.

In the present embodiment, as shown in FIG. 4, the plurality of injection boles 35 are each a straight hole.

3. DETAILED CONFIGURATION OF BELT 10

Figure 5A:
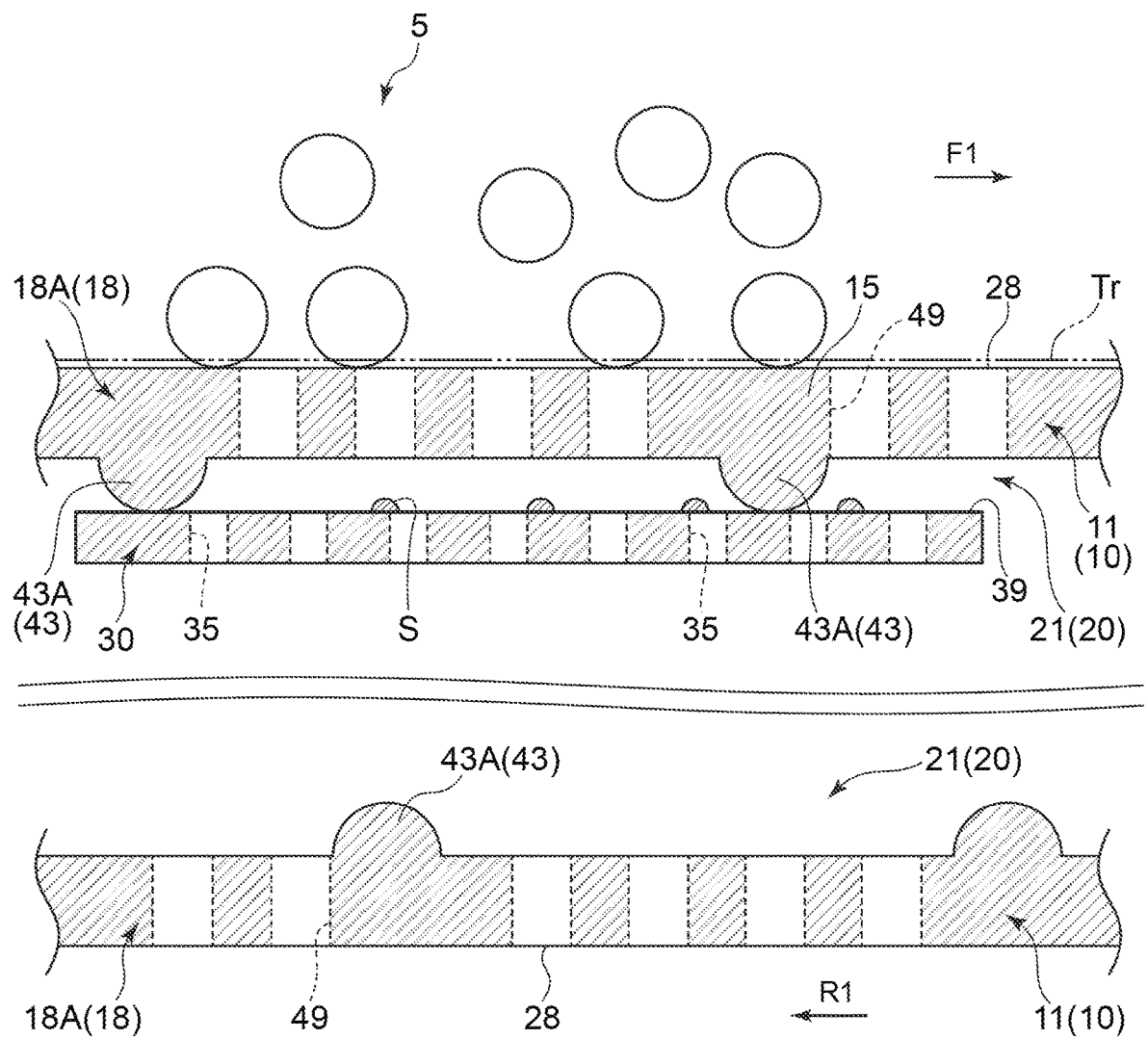
FIG. 5A is a conceptual explanatory view of a belt according to the first embodiment.
Figure 5B:
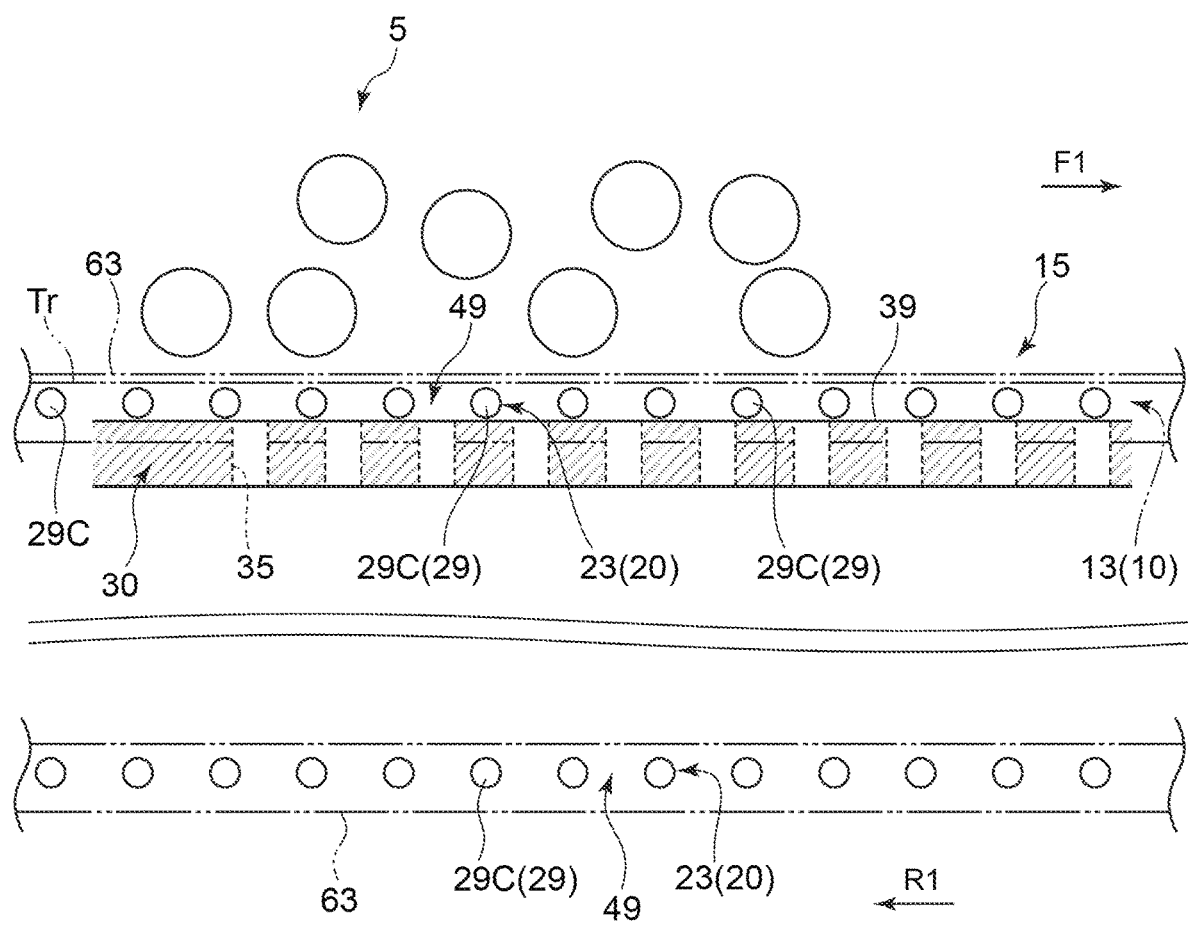
FIG. 5B is a conceptual explanatory view of a belt according to the second embodiment.
Figure 5C:
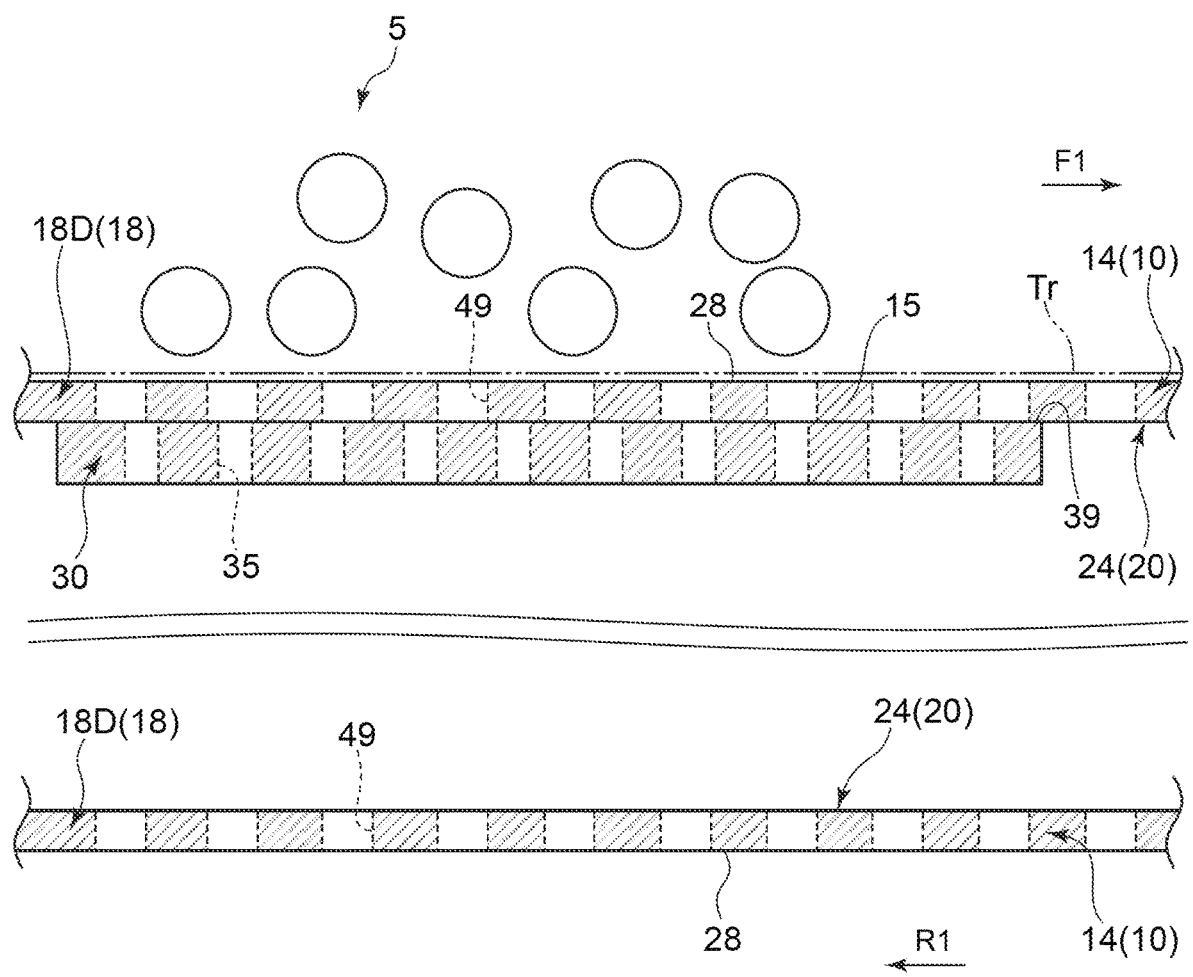
FIG. 5C is a conceptual explanatory view of a belt according to the third embodiment.
Figure 6:
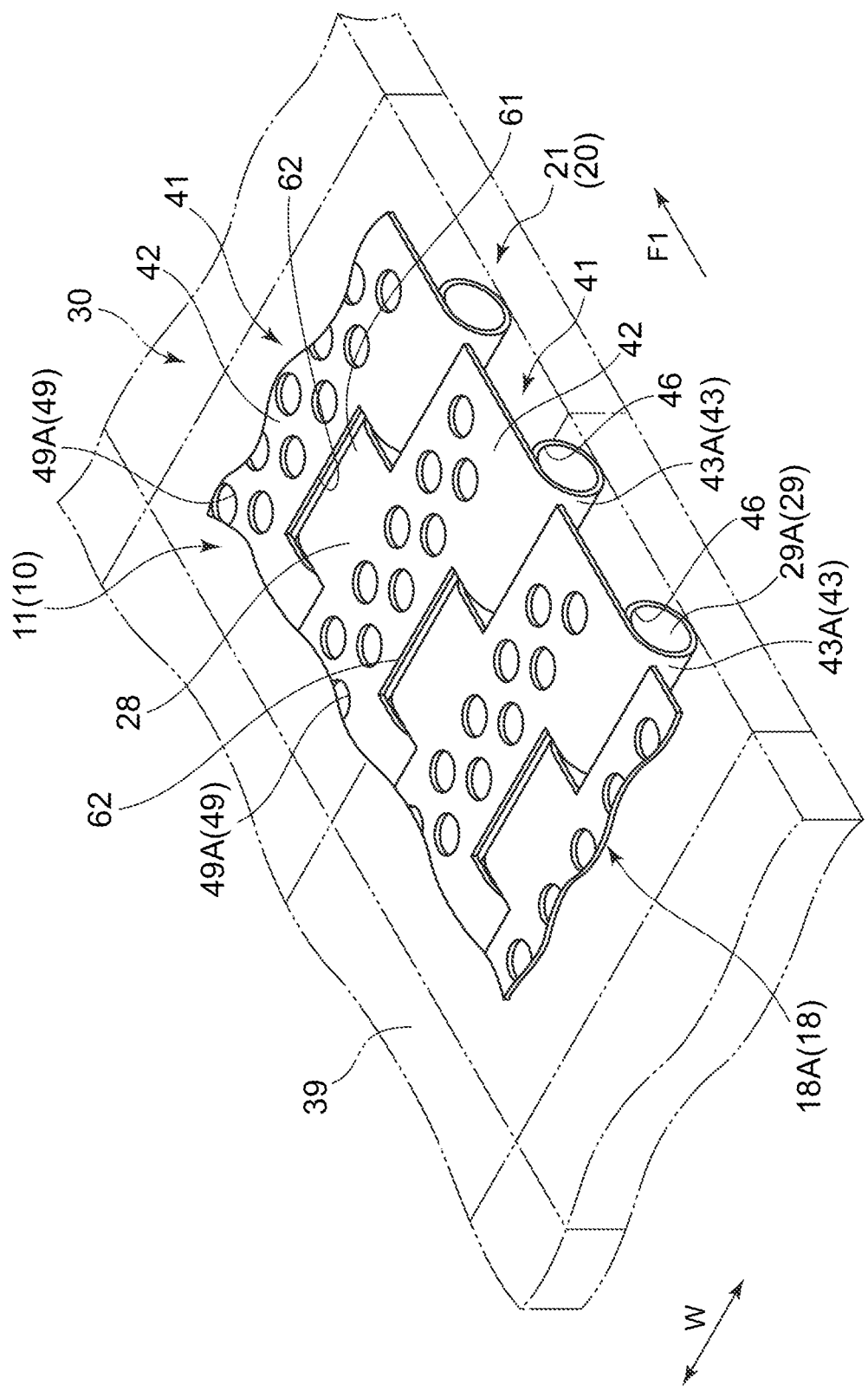
FIG. 6 is a conceptual perspective view of the belt according to the first embodiment.
Figure 7:
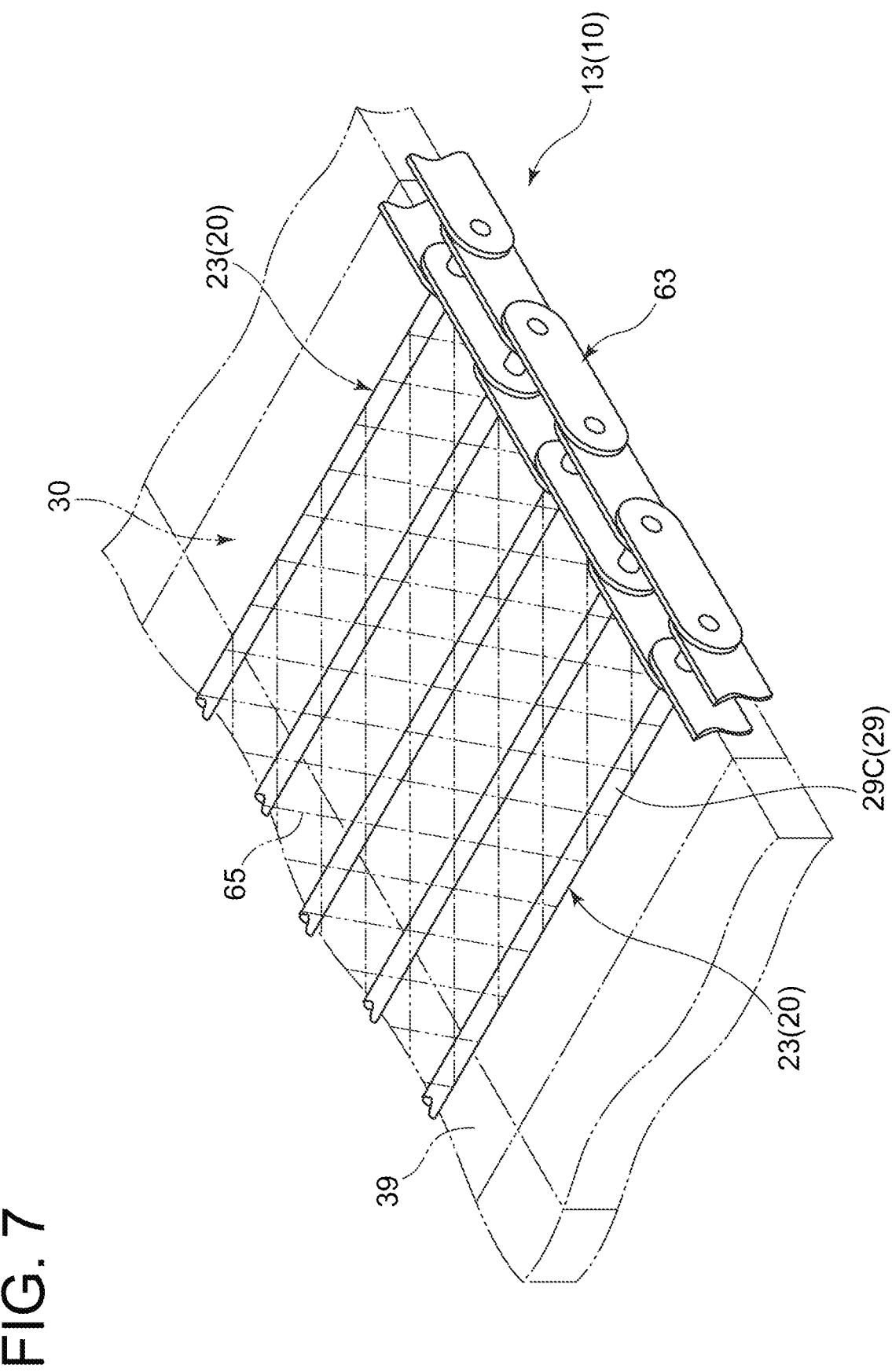
FIG. 7 is a conceptual perspective view of the belt according to the second embodiment.

The detailed configuration of the belt 10 will be exemplified with reference to FIGS. 5A to 5C. FIGS. 5A to 5C are, respectively, conceptual explanatory views of a belt 11 (10) according to the first embodiment, a belt 13 (10) according to the second embodiment, and a belt 14 (10) according to the third embodiment. FIG. 6 is a conceptual perspective view of the belt 11 (10) according to the first embodiment. FIG. 7 is a conceptual perspective view of the belt 13 (10) according to the second embodiment.

<3-1. Exemplification of Belt 10 According to Some Embodiments>

As exemplified in FIGS. 5A to 5C, the belts 11, 13, 14 (10), respectively, include sliding portions 21, 23, 24 configured to move while sliding on the upper surface 39 of the injection plate 30 in the traveling direction (arrow F1) of the conveying portion 15 of the belt 10. In the following description, the sliding portions 21, 23, 24 may collectively be referred to as the "sliding portion 20". The belt 10 may include the plurality of sliding portions 20 disposed at intervals in the traveling direction, or may include the single sliding portion 20.

The sliding portion 20 is located on a side of the conveying portion 15 opposite to a conveying path Tr. The conveying path Tr is a virtual plane defined by an upper end of the conveying portion 15. The conveying path Tr of the present embodiment extends in the traveling direction of the conveying portion 15 and the width direction of the belt 10. Along with traveling of the conveying portion 15, the sliding portion 20 can slide not only on the upper surface 39 of the injection plate 30 but also on an upper end portion of the inner wall surface 381, 382 (see FIG. 4) surrounding the injection hole 35. Thus, the sliding portion 20 can remove an adhering object S (see FIG. 5A) adhering to the injection plate 30. The adhering object S can include at least one of the juice (such as the fruit juice) or water contained in the particles objects 5, or a frozen object generated by freezing the juice or water.

The sliding portion 20 extending in the width direction may be constituted by a plurality of parts, or may be constituted by a single part.

With the above configuration, even if the juice (such as the fruit juice) or water contained in the particles objects 5 falls on the injection plate 30 from the conveying portion 15, the sliding portion 20 can remove the adhering object S from the upper surface 39 of the injection plate 30. In addition, the sliding portion 20 can also remove the adhering object S adhering to the inner wall surface 381, 382 surrounding the injection hole 35 of the injection plate 30. Thus, it is possible to suppress clogging of the plurality of injection holes 35, making it possible to stabilize the flow of the cooling gas passing through the injection holes 35. Further, the freezing device I can suppress a decrease in freezing function.

The adhering object S of the present embodiment moves with the conveying portion 15 after being scraped by the sliding portion 20, and falls from a downstream end of the injection plate 30.

As shown in FIGS. 5A to 5C, the sliding portion 20 of the present embodiment is located on the side of the conveying portion 15 opposite to the conveying path Tr. With the above configuration, the sliding portion 20 can more reliably pass through a falling point of the juice or water contained in the conveyed particles objects 5 on the upper surface 39 of the injection plate 30. Thus, the sliding portion 20 can contact the adhering object S more reliably, allowing the freezing device I to remove the adhering object S more reliably. Object S is blown off from the conveyor portion 15 too.

The sliding portion 20 of the present embodiment extends in parallel to the width direction. As an example, an acute angle formed by an extension direction of the sliding portion 20 and the width direction of the belt 10 in a planar view is not greater than 15 degrees. If the sliding portion 20 is inclined with respect to the traveling direction in the planar view, the adhering object S scraped by the sliding portion 20 may move not in the traveling direction but in the width direction, and may be clogged in the another injection hole 35. As the clogged injection hole 35 is located upstream in the traveling direction, the particles objects 5, which pass through a cooling space where the flow of the cooling gas is changed due to the clogging, are in a state soon after being loaded. The particles objects 5 immediately after the start of freezing in the surface portions thereof are in a particularly delicate state, which may make it impossible to implement successful freezing unless the cooling gas blows against the particles objects 5 as desired.

In this regard, with the above configuration, the sliding portion 20 extending in parallel to the width direction easily moves the adhering object S downstream in the traveling direction, making it possible to suppress that the scraped adhering object S re-enters the injection hole 35 upstream in the traveling direction. Accordingly, the freezing device 1 can implement successful freezing of the particles objects 5.

Further, the length of the sliding portion 20 is shortened by extending the sliding portion 20 in the width direction, allowing the freezing device I to simplify the configuration of the belt 10.

The belt 11 (10) shown in FIG. 5A includes a traveling portion 18A (18) formed into an endless shape so as to surround the injection plate 30. The traveling portion 18 has an outer surface which is a conveying surface 28 configured to place the particles objects 5. In the present embodiment, a section of the traveling portion 18 located at an upper end portion of a travel range is the above-described conveying portion 15, and the conveying surface 28 of the conveying portion 15 coincides with the above-described conveying path Tr. The sliding portion 21 (20) is a protrusion 43A (43) protruding toward a side of the traveling portion 18 opposite to the conveying surface 28.

With the above configuration, since the sliding portion 21 is the protrusion 43, a contact area between the sliding portion 21 and the injection plate 30 is reduced. A friction force caused between the injection plate 30 and the sliding portion 21 moving in the traveling direction is reduced, allowing the freezing device 1 to reduce a load caused in the belt 11 when the adhering object S is removed.

<3-1-1. Belt 1 According to First Embodiment>

The belt 11 (10) according to the first embodiment will be exemplified in detail with reference to FIG. 6. The arrow W shown in FIG. 6 indicates the width direction of the belt 11. FIG. 6 schematically illustrates, by a double-dotted chain line, the injection plate 30 that has already been described with reference to FIGS. 3A to 4 (the same also applies to FIG. 7).

The traveling portion 18A (18) of the belt 11 has a plurality of parts 41 disposed along the traveling direction. Then, each part 14 has a plate 42 in which a plurality of vents 49A (49) are disposed. The vents 49A shown in FIG. 6 are each a circular hole, but may each be, for example, a rectangular hole in another embodiment.

The plate 42 has one end surface which is the above-described conveying surface 28. Further, a projection 61 is formed at one end portion of the plate 42 in the traveling direction, and a recess 62 is formed at another end portion of the plate 42 in the traveling direction. The projection 61 and the recess 62 are disposed at the same position in the width direction of the belt 11. Therefore, the two plates 42 adjacent in the traveling direction are coupled to each other such that the projection 61 disposed in one of these two plates 42 fits in the recess 62 disposed in the other plate 42.

A more detailed coupling structure of the plates 42 adjacent in the traveling direction is as follows, as an example.

Each part 41 has the above-described protrusions 43A (43) disposed on the surface opposite to the conveying surface 28. The cylindrical protrusions 43A formed integrally with the plate 42 are disposed at a position alongside of the projection 61 in a thickness direction of the belt 11 and a position alongside of the recess 62 in the width direction of the belt 11, respectively (FIG. 6 only illustrates the protrusion 43A disposed alongside of the recess 62 in the width direction). Therefore, the protrusions 43A respectively disposed on the plates 42 adjacent in the traveling direction are disposed in the width direction of the belt 11. Further, each protrusion 43A is provided with a hole 46 opened in the width direction. Then, the boles 46 of the protrusions 43A disposed in the width direction are inserted with rods 29A (29) extending in the width direction, respectively. Thus, the protrusions 43A disposed in the width direction are coupled via the rods 29A. Accordingly, the plates 42 adjacent in the traveling direction are coupled to each other.

The sliding portion 21 of the present embodiment includes at least one of the plurality of protrusions 43A. That is, the at least one of the plurality of protrusions 43A functions as the sliding portion 21. With the above configuration, since the protrusion 43A taking on the function of supporting the rod 29 coupling the plurality of plates 42 also functions as the sliding portion 21 for scraping the adhering object S, the freezing device 1 can simplify the configuration of the belt 11.

The protrusion 43A may have the cylindrical shape as illustrated in FIG. 6, or may be a columnar body as illustrated in FIG. 5A. If the protrusion 43A is the columnar body, the protrusion 43A may not support the above-described rod 29A.

In some embodiments, the sliding portion 21 is formed by a resin material. In this case, a reduction in weight of the sliding portion 21 is implemented, making it possible to reduce a load when the belt 11 travels.

In another embodiment, the sliding portion 21 is formed by a metal material. In this case, the sliding potion 21 is hardly deformed when sliding on the upper surface 39 of the injection plate 30. Thus, a force for removing the adhering object S is easily transmitted from the sliding portion 21 to the adhering object S. Accordingly, it is possible to remove the adhering object S more reliably.

<3-1-2. Belt 13 According to Second Embodiment>

The belt 13 (10) according to the second embodiment will be exemplified in detail with reference to FIGS. 5B, 7. The belt 13 is a chain belt and includes endless chains 63 respectively disposed at both ends in the width direction (FIG. 7 partially illustrates only the chain 63 on one side in the width direction). A pair of chains 63 of the present embodiment are located at both sides of the conveying path Tr (see FIG. 5C) in the width direction. That is, the particles objects 5 are not placed on the pair of chains 63. The chain 63 illustrated in FIG. 7 is provided with two kinds of links which include a pair of plates facing in the width direction. These two kinds of links having different lengths in the width direction are alternately disposed along the traveling direction of the belt 13.

In another embodiment, not less than three kinds of links may be included in the chain 63. In this case, the three kinds of links having different lengths in the width direction are sequentially disposed in the traveling direction. Further, the pair of plates serving as the constituent elements of the links may be formed integrally with each other, instead of being formed independent of each other as illustrated in FIG. 7. In this case, each link is formed into a substantially U shape.

The belt 13 of the present embodiment includes rods 29C (29) each coupled to the pair of chains 63. The respective rods 29C extend in the width direction, and are disposed at intervals in the traveling direction of the belt 13. Each rod 29C of the present embodiment rotatably couples the two links constituting the chains 63. The sliding portion 23 (20) of the present embodiment includes at least one of the plurality of rods 29C. With the above configuration, since the rod 29C taking on the function of coupling the pair of chains 63 also functions as the sliding portion 23 for removing the adhering object S, the freezing device I can simplify the configuration.

The rods 29C of the present embodiment extend at least continuously in an area from the injection hole 35 (see FIG. 5B) on farthest one side to the injection hole 35 on farthest another side in the width direction of the belt 13. With the above configuration, the sliding portion 23 (20) can remove the adhering object S in any of the plurality of injection holes 35, making it possible to suppress clogging of the injection hole 35 more reliably.

The rods 29C may continuously extend in an area from one end to another end in the width direction of the injection plate 30.

The sliding portion 23 may include a net 65 supported by the plurality of rods 29C. FIG. 7 virtually illustrates the net 65 by a long dashed double-dotted line. The net 65 is formed by a metal material, a resin material, a fiber material, or the like. The metallic net 65 is a wire mesh, and the belt 13 in this case is a mesh conveyor belt.

In this case, the sliding portion 23 includes the net 65 together with the rods 29C. With the above configuration, the net 65 removes the adhering object S together with the rods 29C, making it possible to suppress clogging of the injection hole 35 more reliably.

<3-1-3. Belt 14 According to Third Embodiment>

Referring back to FIG. 5C, the belt 14 (10) according to the third embodiment will be exemplified in detail. The belt 14 is a plate conveyor, as an example. The belt 14 includes the traveling portion 18D (18) formed into an endless shape so as to surround the injection plate 30. The sliding portion 24 (20) of the present embodiment is a back surface which is located on a side of the traveling portion 18D (18) opposite to the conveying surface 28 and is in surface contact with the upper surface 39 of the injection plate 30.

With the above configuration, since the sliding portion 24 is in surface contact with the upper surface 39 of the injection plate 30, it is possible to remove the adhering object S more reliably, and to suppress clogging of the injection hole 35 more reliably.

4. CONCLUSION

The contents described in some embodiments described above would be understood as follows, for instance.

1) A particles object freezing device (1) according to at least one embodiment of the present disclosure includes an air-permeable belt (10) configured to support conveyance of a particles object (5), and an injection plate (30) which includes a plurality of injection holes (35) configured to inject a cooling gas for fluidizing the particles object (5) toward the belt (10) from below. The injection plate (30) includes a first injection part (31) and a second injection part (32) which are disposed along a width direction of the belt (10), and are different in opening ratio. A first boundary (301) between the first injection part (31) and the second injection part (32) is along a traveling direction of the belt (10).

With the above configuration 1), since the first injection part (31) and the second injection part (32) which are different in opening ratio are disposed in the width direction of the belt (10), the conveyed particles objects (5) are activated in movement in the width direction. Further, since the first boundary (301) between the first injection part (31) and the second injection part (32) is along the traveling direction of the belt (10), active movement of the particles objects (5) in the width direction is further promoted. Consequently, active movement of the particles objects (5) at different positions in the conveying direction is appropriately suppressed, appropriately suppressing active movement of the particles objects (5) having different rates of freezing. Accordingly, the particles object freezing device (1) is implemented which is improved in appearance quality of the frozen particles objects (5).

2) In some embodiments, in the particles object freezing device (1) according to the above configuration 1), the first boundary (301) has a length in the traveling direction which is not less than one third of each of a length of the first injection part (31) in the traveling direction and a length of the second injection part (32) in the traveling direction.

With the above configuration 2), the length of the first boundary (301) in the traveling direction is ensured, allowing active movement of the particles objects (5) above the first injection part (31) and the particles objects (5) above the second injection part (32) in the width direction to be more dominant, and making it possible to further improve appearance quality of the frozen particles objects (5).

3) In some embodiments, in the particles object freezing device (1) according to the above configuration 1) or 2), a range where the first injection part (31) is disposed in the traveling direction and a range where the second injection part (32) is disposed in the traveling direction coincide with each other.

With the above configuration 3), a destination of the particles objects (5) fluidizing across the first boundary (301) is more reliably above the first injection part (31) or above the second injection part (32), allowing active movement of the particles objects (5) in the width direction to be more dominant.

4) In some embodiments, in the particles object freezing device (1) according to any one of the above configurations 1) to 3), the first injection part (31) and the second injection part (32) are independent of each other.

With the above configuration 4), since the first injection part (31) and the second injection part (32) are each replaceable, it is possible to improve convenience of the injection plate (30).

5) In some embodiments, in the particles object freezing device (1) according to the above configuration 4), at least one of the first injection part (31) or the second injection part (32) is selectively mounted with any of a plurality of injection parts (51) which are different in the opening ratio.

With the above configuration 5), since the at least one of the first injection part (31) or the second injection part (32) is replaceable with any of the plurality of injection parts (51) which are different in the opening ratio, the particles object freezing device (1) can perform proper freezing in accordance with the type of particles object (5) to be frozen.

6) In some embodiments, the particles object freezing device (1) according to the above configurations 4) or 5) further includes a support frame (90) to which the injection plate (30) is removably attached. The first injection part (31) and the second injection part (32) are removably attached to the support frame (90).

With the above configuration 6), since the attachment position of the injection plate (30) is settled, even if the first injection part (31) or the second injection part (32) is newly attached along with replacement, it is possible to attach the injection part at the same position as before replacement. Thus, even after replacement of at least one of the first injection part (31) or the second injection part (32), the injection plate (30) can stably inject the cooling gas.

7) In some embodiments, in the particles object freezing device (1) according to any one of the above configurations 1) to 6), the first injection part (31) and the second injection part (32) have the same length in the width direction.

With the above configuration 7), since the first injection part (31) and the second injection part (32) having the same length in the width direction are disposed in the width direction, it is possible to simplify the configuration of the injection plate (30).

8) In some embodiments, in the particles object freezing device (1) according to any one of the above configurations 1) to 7), the injection plate (30) further includes a third injection part (33) adjacent to the first injection part (31) in the traveling direction, and the opening ratio of the third injection part (33) is different from the opening ratio of the first injection part (31).

With the above configuration 8), since the opening ratio of the injection plate (30) changes not only in the width direction but also in the traveling direction, it is possible to further vary the flow of the cooling gas injected by the injection hole (35), allowing the particles objects (5) to be exposed to the cooling gas in the more dispersed state. Thus, it is possible to suppress coagulation freezing where the particles objects (5) are frozen in clumps. Accordingly, it is possible to further improve appearance quality of the frozen particles objects (5).

9) In some embodiments, in the particles object freezing device (1) according to the above configuration 8), the injection plate (30) includes a plurality of array injection parts (55) including the first injection part (31) and the second injection part (32), the plurality of array injection parts (55) being arrayed in the width direction, the first injection part (31), the second injection part (32), and the third injection part (33) are independent of each other, and the third injection part (33) has the same shape as any of the plurality of array injection parts (55).

With the above configuration 9), the third injection part (33) is any of the plurality of array injection parts (55) arrayed in the width direction, it is possible to simplify the configuration of the injection plate (30) while varying the flow of the cooling gas injected.

10) In some embodiments, in the particles object freezing device (1) according to the above configuration 8) or 9), a second boundary (302) between the third injection part (33) and the first injection part (31) is along the width direction.

With the above configuration 10), it is possible to reduce a difference in status of freezing process of the particles objects (5) conveyed across the second boundary (302) between the third injection part (33) and the first injection part (31), making it possible to properly control the status of freezing process of the particles objects (5).

11) In some embodiments, in the particles object freezing device (1) according to any one of the above configurations 1) to 10), the injection plate (30) includes a plurality of array injection parts (55) including the first injection part (31) and the second injection part (32), the plurality of array injection parts (55) being arrayed in the width direction, the plurality of array injection parts (55) are arrayed in a plurality of columns along the traveling direction, and the opening ratio of the injection plate (30) regularly changes over an entire length of the injection plate (30) in the width direction and the entire length in the traveling direction.

With the above configuration 11), it is possible to simplify the configuration of the injection plate (30) while varying the flow of the cooling gas injected by the injection plate (30).

12) In some embodiments, in the particles object freezing device (1) according to the above configuration 11), the plurality of array injection parts (55) are, respectively, a plurality of rectangular plates formed independently of each other and having the same length in the traveling direction, and of the array injection parts (55) included in the injection plate (30), any two of the array injection parts (55) adjacent in the traveling direction or the width direction are in surface contact with each other.

With the above configuration 12), passage of the cooling gas is restricted at respective boundaries of the array injection parts (55). Locations through which the cooling gas passes are consolidated to the plurality of injection holes (35), making it possible to have desired injection by the injection plate (30) and to successfully freeze the particles objects (5).

REFERENCE SIGNS LIST

1: Freezing device (particles object freezing device)
5: Particles object
10: Belt
30: Injection plate
31: First injection part
32: Second injection part
33: Third injection part
35: Injection hole
41: Part
42: Plate
46: Hole
51: Injection part
55: Array injection part
90: Support frame
301: First boundary
302: Second boundary

The invention claimed is:

1. A particles object freezing device, comprising:
an air-permeable belt configured to support conveyance of a particles object; and
an injection plate which includes a plurality of injection holes configured to inject a cooling gas for fluidizing the particles object toward the belt from below,
wherein the injection plate includes:
a first injection part including a plurality of first injection holes among the plurality of injection holes, each of the plurality of first injection holes extending straightly along a normal direction of the injection plate; and
a second injection part disposed adjacent to the first injection part in a width direction of the air-permeable belt and including a plurality of second injection holes among the plurality of injection holes, each of the plurality of second injection holes extending straightly along the normal direction,
wherein a first opening ratio at which the plurality of first injection holes are formed in the first injection part is different from a second opening ratio at which the plurality of second injection holes are formed in the second injection part, and
wherein a first boundary between the first injection part and the second injection part is along a traveling direction of the belt.

2. The particles object freezing device according to claim 1,
wherein the first boundary has a length in the traveling direction which is not less than one third of each of a length of the first injection part in the traveling direction and a length of the second injection part in the traveling direction.

3. The particles object freezing device according to claim 1,
wherein a range where the first injection part is disposed in the traveling direction and a range where the second injection part is disposed in the traveling direction coincide with each other.

4. The particles object freezing device according to claim 1,
wherein the first injection part and the second injection part are independent of each other.

5. The particles object freezing device according to claim 4,
wherein at least one of the first injection part or the second injection part is selectively mounted with any of a plurality of injection parts which are different in the opening ratio.

6. A particles object freezing device, comprising:
an air-permeable belt configured to support conveyance of a particles object; and
an injection plate which includes a plurality of injection holes configured to inject a cooling gas for fluidizing the particles object toward the belt from below,
wherein the injection plate includes a first injection part including first injection holes among the plurality of injection holes and a second injection part including second injection holes among the plurality of injection holes, the first injection part and the second injection part being disposed along a width direction of the belt and having mutually different opening ratios,
wherein a first boundary between the first injection part and the second injection part is along a traveling direction of the belt,
wherein the first injection part and the second injection part are independent of each other,
wherein the particle object freezing device further comprises a support frame to which the injection plate is removably attached,
wherein the first injection part including the first injection holes and the second injection part including the second injection holes are removably attached to the support frame.

7. The particles object freezing device according to claim 1,
wherein the first injection part and the second injection part have the same length in the width direction.

8. The particles object freezing device according to claim 1,
wherein the injection plate further includes a third injection part adjacent to the first injection part in the traveling direction, and
wherein the opening ratio of the third injection part is different from the opening ratio of the first injection part.

9. The particles object freezing device according to claim 8,
wherein the injection plate includes a plurality of array injection parts including the first injection part and the second injection part, the plurality of array injection parts being arrayed in the width direction,
wherein the first injection part, the second injection part, and the third injection part are independent of each other, and
wherein the third injection part has the same shape as any of the plurality of array injection parts.

10. The particles object freezing device according to claim 8,
wherein a second boundary between the third injection part and the first injection part is along the width direction.

11. The particles object freezing device according to claim 1,
wherein the injection plate includes a plurality of array injection parts including the first injection part and the second injection part, the plurality of array injection parts being arrayed in the width direction,
wherein the plurality of array injection parts are arrayed in a plurality of columns along the traveling direction, and
wherein the opening ratio of the injection plate regularly changes over an entire length of the injection plate in the width direction and the entire length in the traveling direction.

12. The particles object freezing device according to claim 11,
wherein the plurality of array injection parts are, respectively, a plurality of rectangular plates formed independently of each other and having the same length in the traveling direction, and
wherein, of the array injection parts included in the injection plate, any two of the array injection parts adjacent in the traveling direction or the width direction are in surface contact with each other.

* * * * *